April 8, 1930. J. R. SCHERER 1,753,907
REAR DOOR FOR VEHICLE BODIES
Filed June 27, 1924 3 Sheets-Sheet 1

INVENTOR.
John R. Scherer
BY Rex Frye
ATTORNEY.

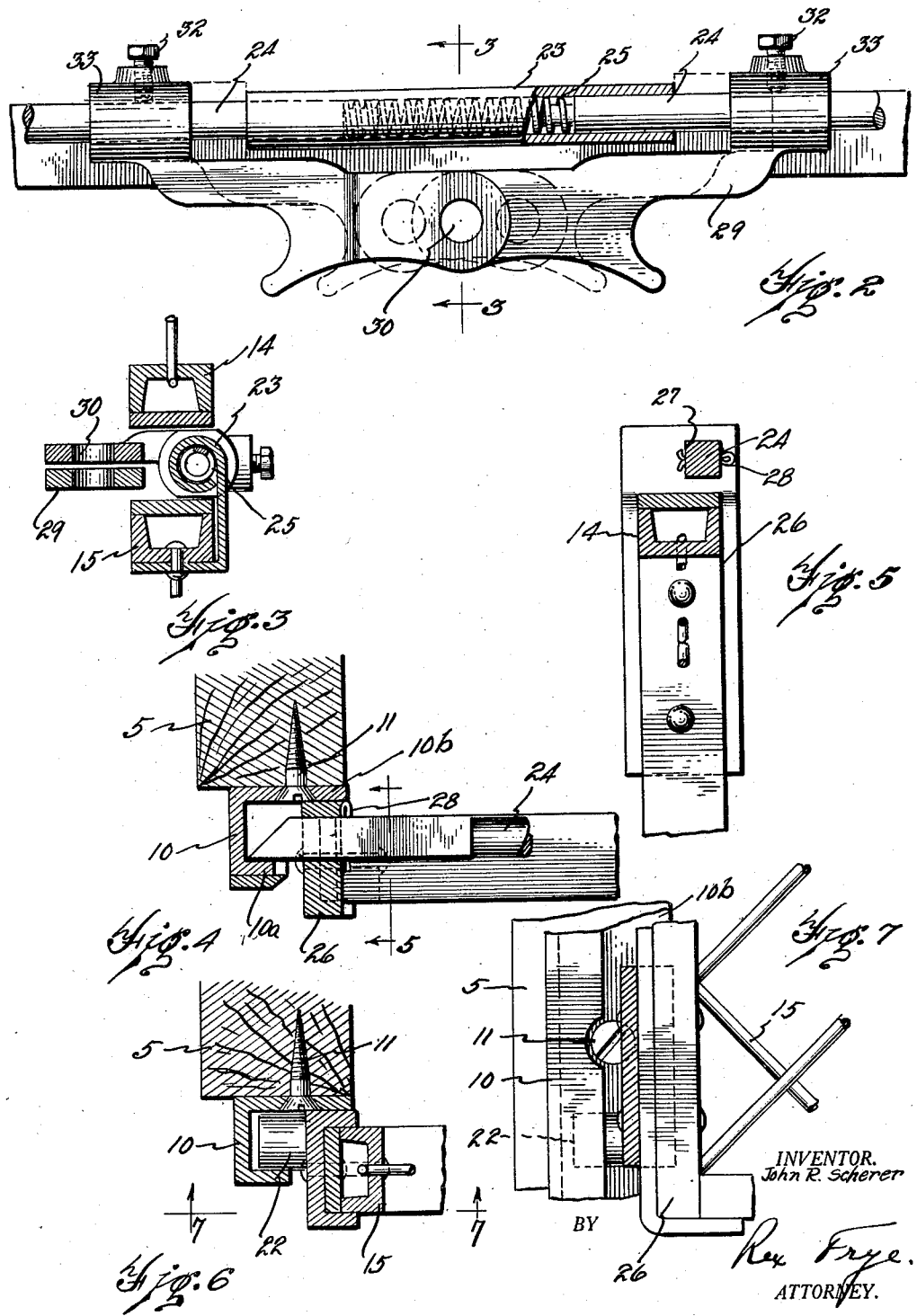

April 8, 1930.  J. R. SCHERER  1,753,907
REAR DOOR FOR VEHICLE BODIES
Filed June 27, 1924   3 Sheets-Sheet 3
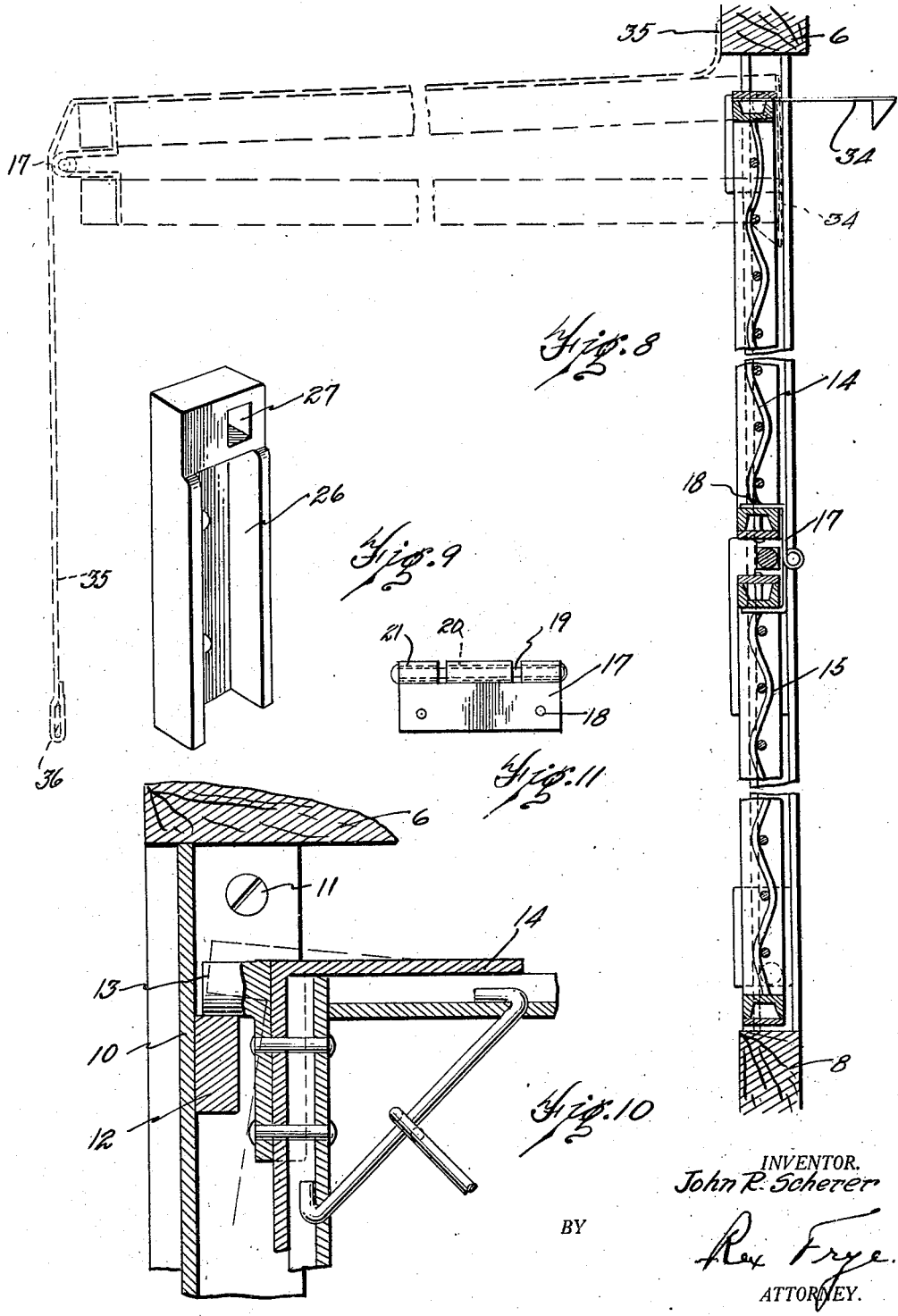
INVENTOR.
John R. Scherer
BY
Rex Frye.
ATTORNEY.

Patented Apr. 8, 1930

1,753,907

UNITED STATES PATENT OFFICE

JOHN R. SCHERER, OF DETROIT, MICHIGAN, ASSIGNOR TO THE ABBEY-SCHERER COMPANY, A CORPORATION OF MICHIGAN

REAR DOOR FOR VEHICLE BODIES

Application filed June 27, 1924. Serial No. 722,642.

This invention relates to rear doors for vehicle bodies of the type known as delivery cars, and has for its primary object the provision of a lockable door co-operating with the usual tail-gate and the sides of the vehicle to secure the rear of the vehicle body against accidental loss or unwarranted removal of merchandise then being carried.

Another object of the invention is the arrangement of the rear door to be folded outwardly at its central portion when unlocked while the lower edge is slid upwardly in lateral guides until latched adjacent the upper edge of the door, in which position free access is permitted to the interior of the vehicle.

A further object of the invention is the mounting of a water proof curtain adapted to cover the door when in closed position and adapted to be supported by the door when in open position to provide a canopy under which the driver may conveniently work while selecting and grouping parcels for delivery.

A further object of the invention is the provision of a rear door assembly constructed of few, light and comparatively inexpensive parts and which may be readily secured upon the delivery bodies now in actual use.

Other objects and advantages will be apparent from the following description, wherein reference is made to the accompanying drawings illustrating a preferred embodiment of my invention and wherein similar reference numerals designate similar parts throughout the several views.

In the drawings:

Fig. 2 is a detail sectional view, with parts broken away of the locking and unlocking mechanism.

Fig. 3 is a detail sectional view taken substantially on the line 3—3 of Fig. 2.

Fig. 4 is a detail sectional view taken substantially on the line 4—4 of Fig. 1.

Fig. 5 is a detail sectional view taken substantially on the line 5—5 of Fig. 4.

Fig. 6 is a detail sectional view taken substantially on the line 6—6 of Fig. 1.

Fig. 7 is a detail sectional view taken substantially on the line 7—7 of Fig. 6.

Fig. 8 is a vertical sectional view taken substantially on the line 8—8 of Fig. 1, showing in full lines the closed position and in dotted lines the open position assumed by the door and associated mechanism.

Fig. 9 is a detail perspective view of a corner bracket for the lower door panel through which passes the central locking bolt.

Fig. 10 is an enlarged detail view showing one upper corner of the upper panel of the door, and Fig. 11 is a detail plan view of one of the hinge members connecting the door panels.

Figure 1:
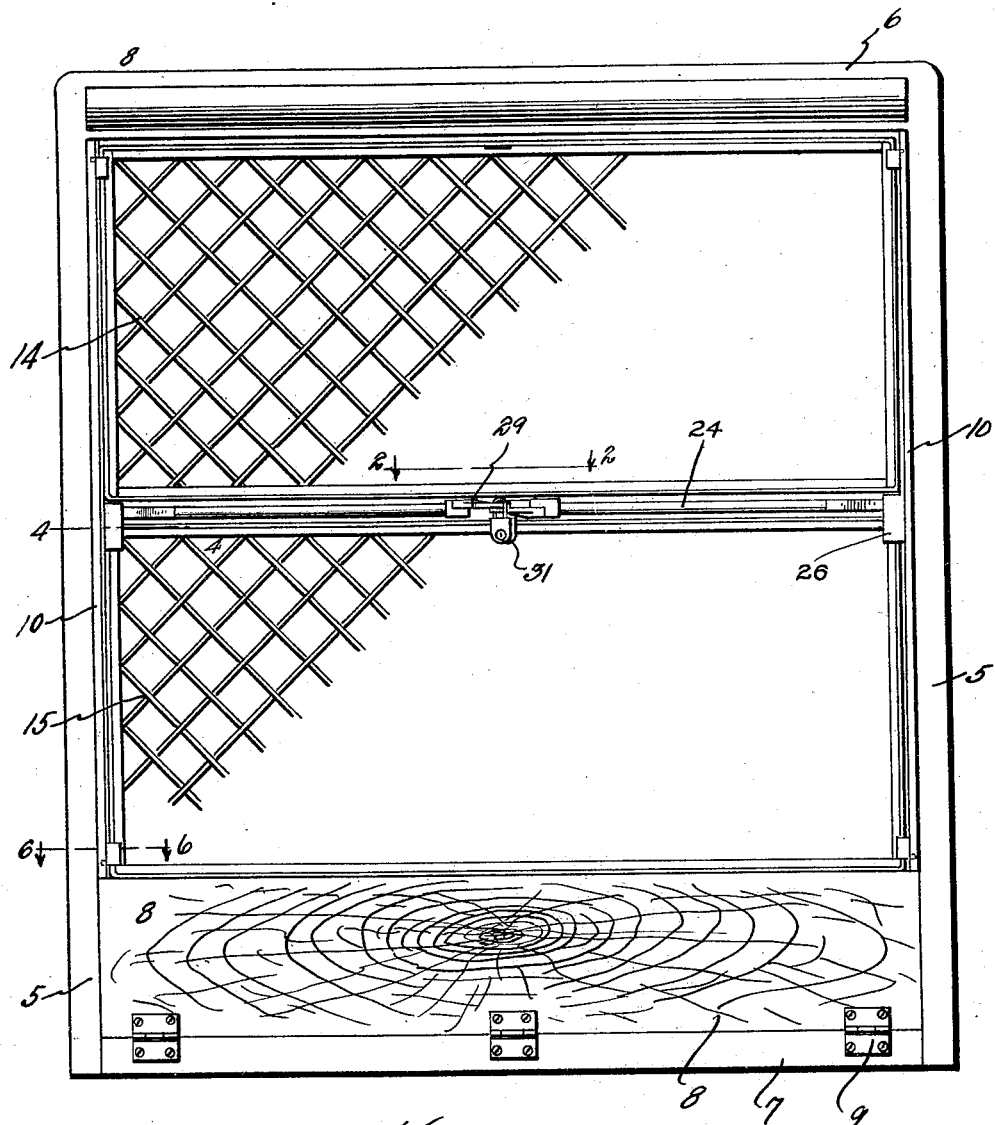
Fig. 1 is a rear elevation of a door constructed in accordance with my invention in locked position.

Referring now to the drawings, the numeral 5 designates the sides of a vehicle body connected at their upper extremities by the top 6 and at their lower extremities by the floor 7 of the vehicle body. Since it is immaterial for the purposes of this invention what form of vehicle body is employed, I have made no attempt herein to illustrate any particular vehicle body, the view in Fig. 1 being merely a rear elevation of a typical vehicle body of the delivery type having an ordinary tail-gate 8 pivoted to the floor 7 of the body by hinges 9.

The rear door construction forming the claimed disclosure of my invention comprises a pair of guide members 10 preferably of angle iron and fixed one on each side of the vehicle body by means of screws or like securing elements 11 (note Figs. 4 and 6). The guides 10 are preferably mounted with their inner edges in substantial alignment with the inner edges of the side pieces 5 of the vehicle body, and the rear walls 10$^a$ of the guides are spaced from the front walls 10$^b$ a sufficient distance to permit the ready travel of lugs on the door panels without binding (note Fig. 6). My complete rear door assembly is arranged to be carried by the guides 10, so that by the proper placing of the screws 11 the rear door assembly can be quickly attached to vehicle bodies now in general use. Adjacent the upper extremities of the guide members 10 are fixed a pair of inwardly extending abutments 12 (note Fig. 10) which serve to support the door panels through outwardly projecting lugs 13 on the upper door panel 14 normally resting upon the abutments 12, while the lower door panel 15 is suspended from the upper door panel through suitable hinges 17. This permits ready assembly of the door panels within the guide members 10, and also allows for relative movement of the door panels within the guide members due to malformation of the vehicle body by warping or twisting strains. As best illustrated in Fig. 10, the lugs 13 of the upper door panel on either side may move upwardly from the abutments 12 without escaping from the confines of the guide members 10 to automatically adjust the position of the door panels within a vehicle body that is out of true alignment. The dotted lines in Fig. 10 show the adjusted position, while the full lines show the normal position of the upper door panel relative to the abutment 12.

The upper door panel 14 is preferably formed with a frame of strap steel in which is suitably secured cross wires arranged in any desired mesh. To the lower cross bar of the frame is connected by rivets 18 or the like a pair of hinges 17 forming the sole connection between the upper panel 14 and the lower door panel 15. As best shown in Figs. 8 and 11 one hinge section is secured to the lower cross bar of the upper door panel and the other hinge section is secured to the upper cross bar of the lower door panel, a pin 19 being loosely mounted within the curved lugs of the hinge members to permit tilting movements of one door panel relatively to the other. By making the pin 19 of lesser diameter than the opening in the hinge lugs, and also by providing spaces between the central lug 20 carried by one door panel and the side lugs 21 carried by the other door panel, I am enabled to join the door panels for the requisite hinging movements and at the same time to permit movements of one door panel relatively to the other to permit their adjusting themselves in twisted or warped vehicle bodies.

The lower door panel is preferably formed with a frame of strap steel carrying intermeshed wires, and is so proportioned in height that the lower cross bar of its frame is adapted to contact the upper face of the tail-gate 8 when both the tail-gate and door panel are in closed position (note Fig. 1). By virtue of this arrangement the tail-gate can be closed in the usual manner, after which the rear door is closed with the lower face of the lower door panel 15 engaging the tail-gate so as to prevent its being swung to open position before the rear door is again opened. Accordingly, a single lock guarding against the unwarranted opening of the rear door will serve to prevent the unwarranted opening of the tail-gate 8. Adjacent its lower corners the lower door panel is provided with a pair of outwardly projecting lugs 22 (note Fig. 6), which are preferably rounded in contour and of slightly less diameter than the space between the forward and rear walls of the guide members 10. The outermost faces of the lugs 22 are spaced from the side walls of the guide members 10 a sufficient distance to permit independent movement of the lugs within the guide members to accommodate the door panels adjusting themselves to warped or twisted vehicle bodies.

The upper cross bar of the lower door panel 15 carries a hollow sleeve 23 (note Figs. 2 and 3) for the reception of the inner extremities of a pair of laterally moving locking members 24, a coil spring 25 within the sleeve abutting the ends of the locking members to normally press them outwardly to the fullest extent permitted. A pair of guide brackets 26 (note Figs. 1 and 9) are secured to the upper corners of the lower door panel 15, and serve the dual purpose of bracing the door panel and providing a secure guide adjacent the sides of the panel for the passage of the locking members 24. As best illustrated in Fig. 4 the outer edges of the locking members 24 are preferably square in contour and pass through a square aperture 27 in the guide bracket 26. A cotter pin 28 is suitably positioned in the square portion of the locking member 24 to engage the inner face of the bracket 26 and limit the outward movement of the locking members under the impulse of the spring 25. Adjustably secured to the locking members 24 adjacent their inner extremities are a pair of handle members 29 (note Figs. 1–3), which are adapted to normally overlap so that apertures 30 in their extremities will normally align when the locking members 24 are in locking position. With the apertures 30 of the handle members in vertical alignment it will be apparent that a padlock 31 or other suitable locking means may be utilized to lock the rear door assembly in closed position. As above noted the locking of the rear door assembly in closed position also serves to lock the tail-gate 8 against unwarranted opening, so that the one padlock will serve to secure the rear of the wagon against accidental loss of merchandise or the unwarranted removal of same through surreptitious opening of the door or tail-gate. In the illustrated embodiment the handle members 29 are secured to the locking members 24 by set screws 32 threaded through sleeves 33 surrounding the locking members. By loosening the set screw and moving one handle member relatively to the other the apertures 30 can be quickly brought into vertical alignment, after which the set screws are tightened. When the handle members are secured upon the locking members substantially as shown in full lines in Fig. 2, it is only necessary to grasp the handle members and move them toward each other to slide the locking members inwardly to clear the guide members 10.

The operation of my improved rear door assembly is believed to be apparent. The guide members 10 are secured at the rear of the ordinary side frame of the vehicle body and carry abutments 12 on which the upper door panel 14 is adapted to rest when the door is closed and to pivot when the door is being opened. The lower door panel is suspended from the upper door panel and carries at its lower extremities a pair of lugs 22 adapted to slide within the guide members 10 when the door is being opened. The locking members 24 carried upon the upper cross bar of the lower door panel normally engage within the guide members 10 to lock the door panels in closed position. Whenever the locking members 24 are freed from the guide members 10 by moving the handle members 29 inwardly, the lower portion of the upper door panel and upper portion of the lower door panel may be swung outwardly and upwardly, the lugs 22 of the lower door panel meanwhile sliding upwardly within the guide members 10 until the lower cross bar of the lower door panel approaches the upper cross bar of the upper door panel (note dotted lines in Fig. 8). A resilient latch member 34 is fixed upon the upper cross bar of the upper door panel in position to catch the lower cross bar of the lower door panel when in raised position and holds the lower door panel open in substantially the dotted line position in Fig. 8. The tail-gate 8 is now free to be opened at will, and accordingly merchandise can be put into or removed from the vehicle body as desired.

A curtain 35 is secured to the top 6 of the vehicle body substantially as shown in Fig. 8 and is adapted to cover the door panels in any position. Thus, as illustrated in dotted lines in Fig. 8 the curtain 35 covers the upper door panel and hangs downwardly from its outermost edge in a sort of canopy effect, whereby the driver of the vehicle may be protected from rain and the like while placing or removing merchandise. When the door is in closed position the curtain 35 hangs downwardly over the wire mesh of the rear doors so as to prevent the entrance of rain or the like, the lower extremity of the curtain being weighted, as by the cross bar 36, to insure its hanging in plumb. If desired, suitable securing elements can be used for preventing flapping of the curtain while the vehicle is in motion.

When it is desired to again close the door, it is only necessary to push the latch 34 out of engagement with the lower cross bar of the lower door panel, whereupon the lower door panel falls to the full line position shown in Fig. 8. The locking members 24 ride over the outer walls of the panel members and then snap into locking position through the momentum of the falling door panel, and it is only necessary to insert the padlock 31 into the handle members 29 to secure the rear door against unwarranted opening. It will be noted that while in closed position the door is braced at six positions; at the upper corners of the upper door panel, and each corner of the lower door panel.

When it is desired to carry rolls of linoleum or other articles of greater length than the vehicle body, it is possible for my improved rear door to be partially open and rest upon the linoleum or the like to retain it against accidental movement out of the wagon. Thus, if the linoleum extends beyond the rear of the vehicle between the tail-gate and the lower cross bar of the door panel, it is only necessary to detach the locking members 24 from the guide members 10 and permit the rear door to be connected with the guide members 10 at only four points, whereby the weight of the door panels will serve to impinge the lower cross bar of the lower door panel upon the linoleum or the like and press it against the tail-gate to secure it in position.

While it will be apparent that the illustrated embodiment of my invention herein disclosed is well calculated to adequately fulfill the objects and advantages primarily stated, it is to be understood that the invention is susceptible to variation, modification and change within the spirit and scope of the subjoined claims.

Having described my invention, I claim:—

1. A rear door mechanism for vehicle bodies comprising a pair of side guides adapted to be secured to the side frames of a vehicle body, said guides having inwardly extending abutments adjacent their upper ends, an upper panel having laterally projecting lugs adapted to rest upon said abutments, a lower panel hinged at its upper extremity to the upper panel and carrying adjacent its lower edges laterally projecting lugs slidable in said guides, and a latch member carried by the upper panel in position to engage the lower panel to hold the panels in raised position.

2. A rear door mechanism for vehicle bodies comprising a pair of side guides adapted to be secured to the side frames of a vehicle body, said guides having inwardly extending abutments adjacent their upper ends, an upper panel having laterally projecting lugs adapted to rest upon said abutments, a lower panel hinged at its upper extremity to the upper panel and carrying adjacent its lower edges laterally projecting lugs slidable in said guides, and a latch member secured to the upper edge of the upper panel and extending at substantially a right angle therefrom and adapted to engage the lower edge of the lower panel to secure the panels in substantially horizontal position adjacent the upper extremity of the side frames.

3. A rear door mechanism for vehicle bodies comprising a pair of side guides adapted to be secured to the side frames of a vehicle body, said guides having inwardly extending abutments adjacent their upper ends, an upper panel having laterally projecting lugs adapted to rest upon said abutments, a lower panel hinged at its upper extremity to the upper panel and carrying adjacent its lower edges laterally projecting lugs slidable in said guides, laterally moving locking members mounted between the panels, means for normally pressing the locking members outwardly into engagement with the side guides, and handles for moving the locking members inwardly to unlock the panels from the guides.

4. A rear door mechanism for vehicle bodies comprising a pair of side guides adapted to be secured to the side frames of a vehicle body, said guides having inwardly extending abutments adjacent their upper ends, an upper panel having laterally projecting lugs adapted to rest upon said abutments, a lower panel hinged at its upper extremity to the upper panel and carrying adjacent its lower edges laterally projecting lugs slidable in said guides, laterally moving locking members mounted between the panels, means for normally pressing the locking members outwardly into engagement with the side guides, and overlapping handles for moving the locking members inwardly to unlock the panels from the guides and having aligned apertures for the reception of a removable lock.

5. A rear door mechanism for vehicle bodies comprising a pair of side guides adapted to be secured to the side frames of a vehicle body, said guides having inwardly extending abutments adjacent their upper ends, an upper panel having laterally projecting lugs adapted to rest upon said abutments, a lower panel hinged at its upper extremity to the upper panel and carrying adjacent its lower edges laterally projecting lugs slidable in said guides, laterally moving locking members mounted between the panels, means for normally pressing the locking members outwardly into engagement with the side guides, handles for moving the locking members inwardly to unlock the panels from the guides, said handles being formed with apertures for the reception of a removable lock, and means for adjustably securing the handles upon the locking members to permit vertical alignment of said apertures.

6. A rear door mechanism for vehicle bodies having a top, side frames and floor, a tail-gate pivoted to the floor, a pair of side guides adapted to be secured upon the side frames, an upper door panel pivotally mounted in the side guides, a lower door panel hinged to the upper door panel and having side lugs slidable in the side guides and adapted to impinge upon the upper surface of the tail-gate when both the tail-gate and door are in closed position, a latch member arranged to secure the door panels in substantially horizontal position adjacent the vehicle top, and a curtain secured to the vehicle top and adapted to be supported by the panels when in said horizontal position to form a canopy extending beyond the rear of the vehicle body.

In witness whereof I hereunto set my hand and seal.

JOHN R. SCHERER.